July 26, 1960  J. M. STRANG ET AL  2,946,257
HIGH SPEED CAMERA

Filed Sept. 8, 1954  8 Sheets-Sheet 1

Inventors
JOHN MARTIN STRANG
& CLAUD FOSTER
By Young, Emery
& Thompson
Attorneys July 26, 1960   J. M. STRANG ET AL   2,946,257
HIGH SPEED CAMERA
Filed Sept. 8, 1954   8 Sheets-Sheet 2

Inventors
JOHN MARTIN STRANG
& CLAUD FOSTER
By Young, Emery
& Thompson
Attorneys July 26, 1960 J. M. STRANG ET AL 2,946,257
HIGH SPEED CAMERA
Filed Sept. 8, 1954 8 Sheets-Sheet 3

Inventors
JOHN MARTIN STRANG
& CLAUD FOSTER
By Young Emery
+ Thompson
Attorneys

July 26, 1960 J. M. STRANG ET AL 2,946,257
HIGH SPEED CAMERA
Filed Sept. 8, 1954 8 Sheets-Sheet 4

*Inventors*
JOHN MARTIN STRANG
& CLAUD FOSTER
By Young, Emery
& Thompson
*Attorneys*

July 26, 1960    J. M. STRANG ET AL    2,946,257
HIGH SPEED CAMERA

Filed Sept. 8, 1954    8 Sheets-Sheet 6

INVENTORS
JOHN MARTIN STRANG
CLAUD FOSTER
BY
ATTORNEY

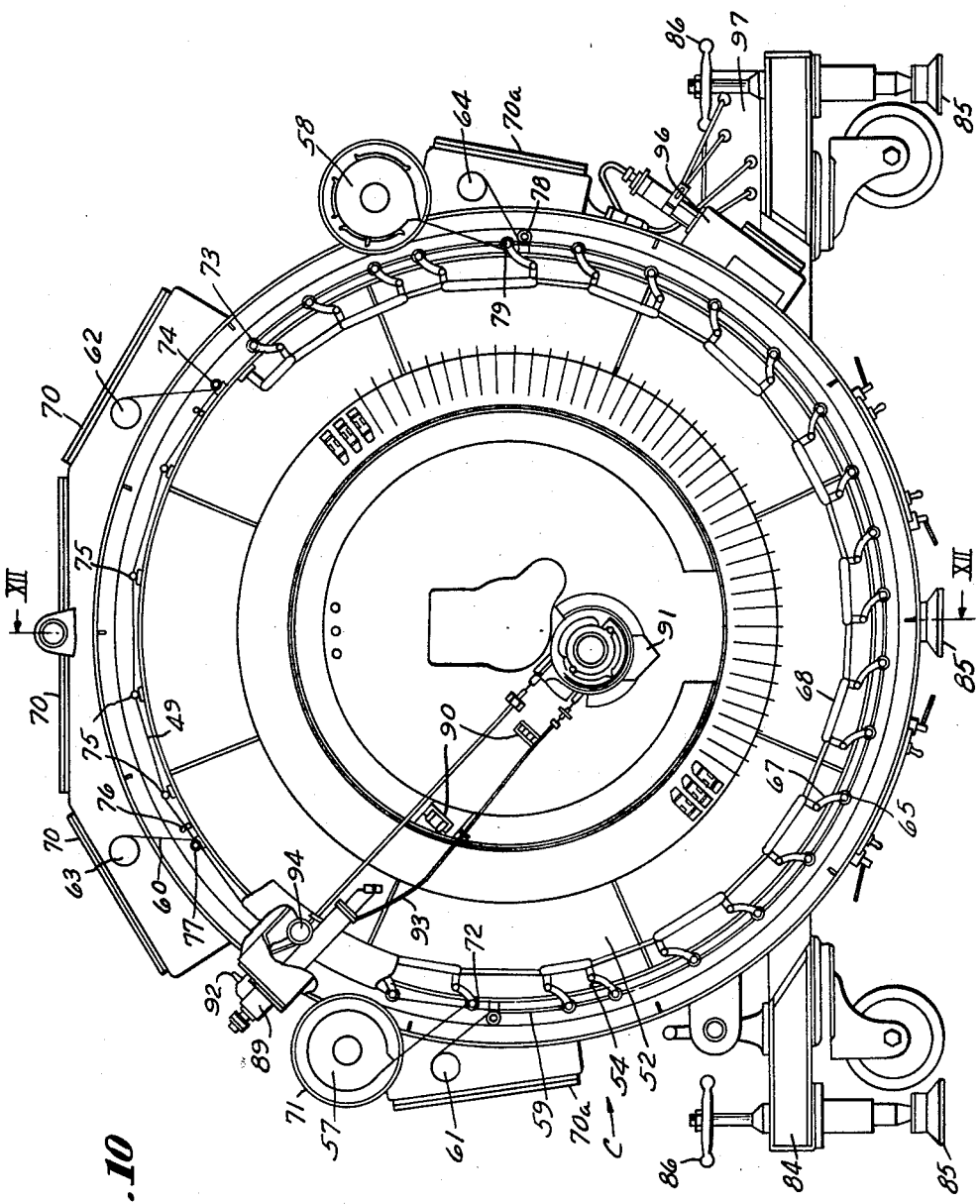

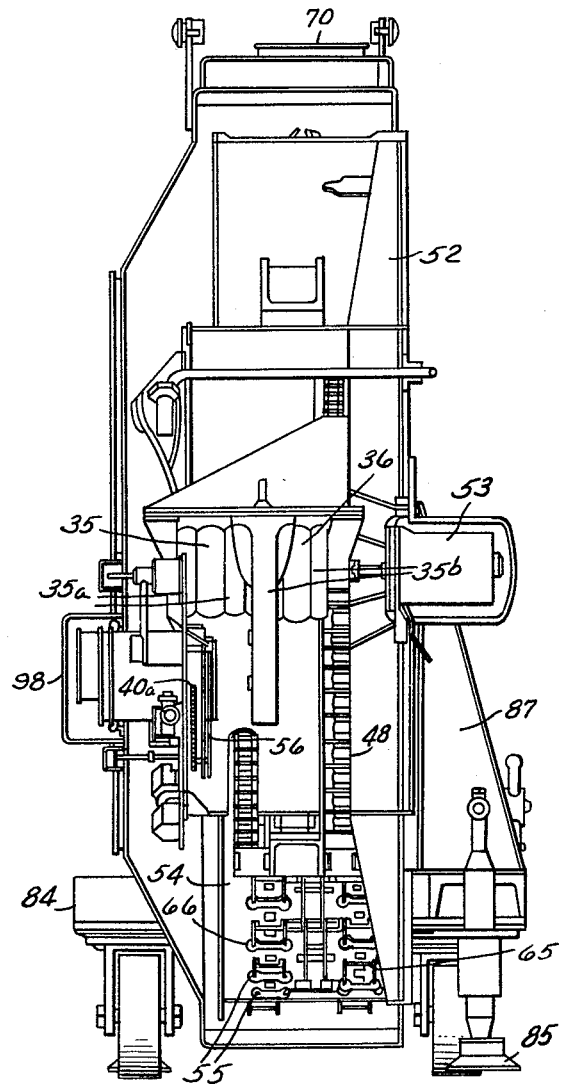

United States Patent Office 2,946,257
Patented July 26, 1960

2,946,257
HIGH SPEED CAMERA

John Martin Strang and Claud Foster, Glasgow, Scotland, assignors to Barr and Stroud Limited, Glasgow, Scotland Filed Sept. 8, 1954, Ser. No. 454,662

Claims priority, application Great Britain Sept. 9, 1953

7 Claims. (Cl. 88—16)

The present invention relates to reflecting prisms, and especially but not exclusively to such prisms for use in scanning unexposed photographic film.

High speed cameras have already been proposed comprising a stationary member of arcuate formation and having a length of unexposed photographic film held around the peripheral surface thereof. Light from the object to be photographed is directed on to a high speed rotatable reflector located within said stationary member on the central axis thereof, whereby the reflected light beam is swept around to scan the film.

According to the present invention we provide a reflecting prism having a flat reflecting surface, and an outer surface opposed to said reflecting surface which outer surface is shaped as part of a sphere, the reflecting surface being at the centre of curvature of such sphere whereby light reflected thereby may enter and leave the prism through and normal to said outer surface.

Preferably the prism comprises two component prisms as aforesaid, arranged with their reflecting surfaces back to back and a part spherical surface on the outer side of each component prism.

Preferably, also, the prism comprises a sphere with opposed segments removed therefrom.

According to the present invention we also provide photographic apparatus for providing a series of exposures over a very short time interval of very fast occurrences, comprising means for supporting a length of photographic film in an arcuate path; a rotatable reflecting prism having a flat reflecting surface containing the prism rotatable axis, and an outer surface opposed to said reflecting surface and shaped as part of a sphere, the centre of curvature of said arcuate path and sphere being coincident with the rotational axis of the prism; means adapted to rotate said prism at high speed to reflect an image-carrying light beam from the object along a narrow field towards said arcuate path in order to scan same; means for focussing the image of the object on said arcuate path; means for interrupting the impact of the light beam on said path at intervals in order to provide separate exposures; and shutter means for limiting the access of rays from the object to the arcuate path to a period of time of a predetermined value in order to prevent double exposure.

Embodiments of the invention will now be described, by way of example, with reference to the accompanying drawings wherein:

Fig. 10 is a part section of the apparatus looking in the direction of arrow B in Fig. 9;

Figs. 11 and 12 are respectively, a part sectional view looking in the direction of arrow C, and a section on the line XII—XII of Fig. 10;

Figure 1:
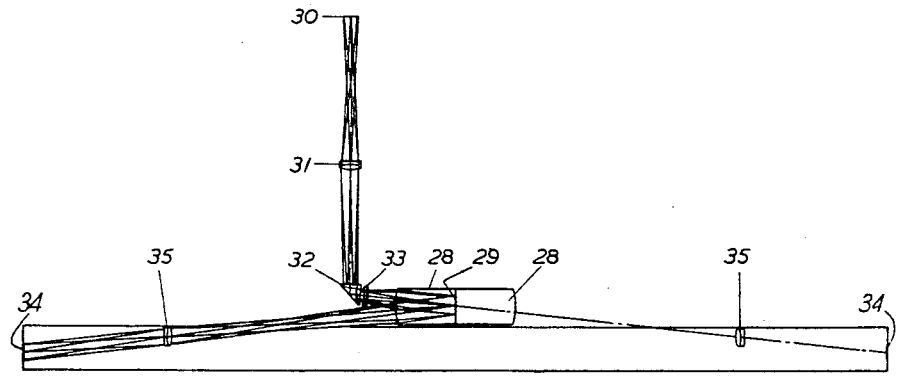
Figs. 1 and 2 are, respectively, a plan view and a fragmentary front elevational view of a high speed camera optical system incorporating a prism according to the invention.
Figure 2:
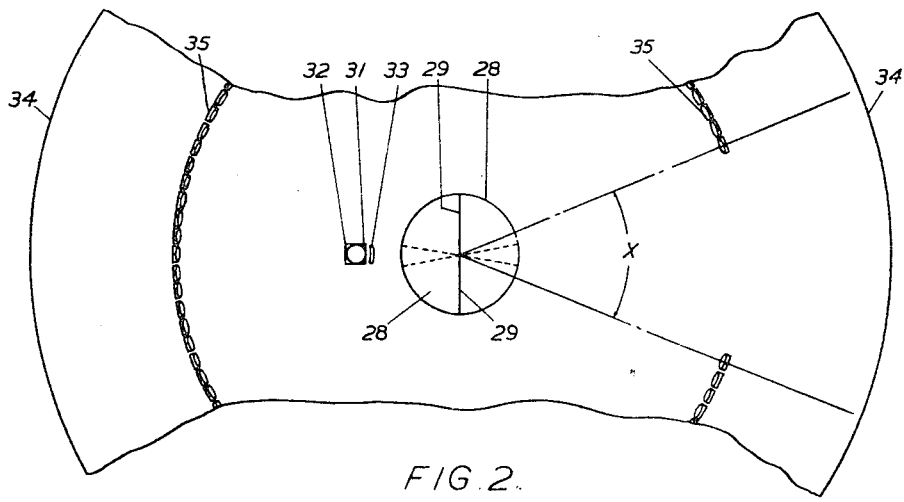
Figure 3:
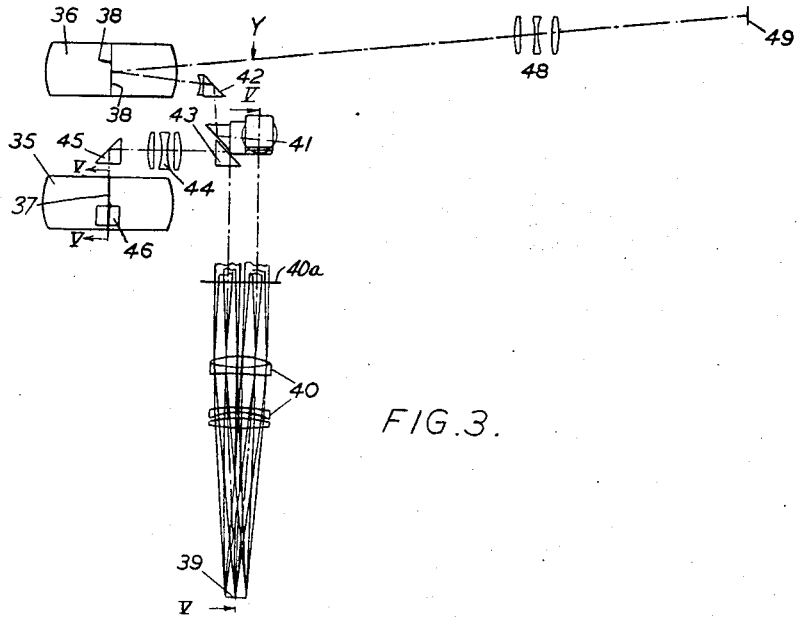
Fig. 3 is a fragmentary plan view of a high speed camera optical system incorporating a pair of prisms according to the invention.
Figure 4:
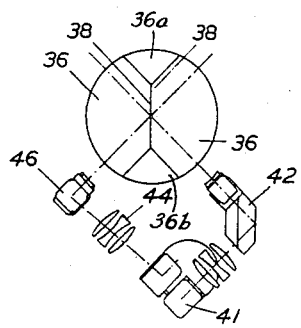
Fig. 4 is an elevational view of the system shown in Fig. 3, in the direction of arrow Y, i.e. looking towards the object to be photographed.
Figure 5:
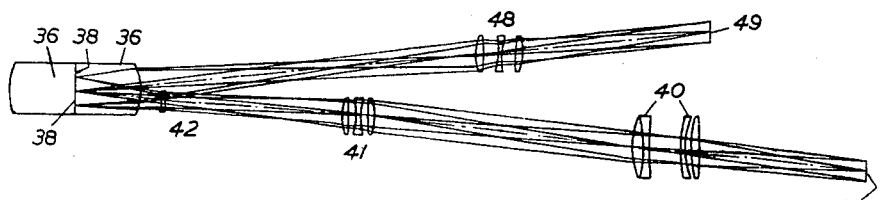
Fig. 5 is a beam diagram illustrated for a single prism and lens system of the type shown in Fig. 3.

In Figs. 1 and 2 the prism 28 is of spherical form with a pair of internal flat back to back diametral reflecting surfaces 29 formed therein, and two opposed segments removed therefrom. It may, however, be completely spherical, or may as shown have an outer surface opposed to said reflecting surfaces 29 which is shaped as part of a sphere only, as shown, the reflecting surfaces 29 being at the centre of curvature of the sphere 28.

The prism is adapted to be rotated about a central axis passing through said surfaces 29.

The light from the object 30 is directed into the prism 28 through a light beam deflecting system comprising an object projector lens 31, reflecting prism 32 and negative lens 33. The light beam from the prism 32 and lens 33 is directed onto the reflecting surface 29 at a slight angle outwardly from the normal thereof, whereby the prism 32 and lens 33 do not interfere with the light beam reflected therefrom.

Upon rotation of the disc-like prism 28 about its central axis, the light beams therefrom sweeps around said axis of rotation and scans a strip of film 34 arranged in circular formation around said axis through a peripheral series of lenses 35.

By forming an intermediate image of the object on the axis of rotation of the prism 28, no movement of the image takes place at the film 34 during the scanning of the latter.

Moreover, the centre prism 28 with its part spherical surface acts as a combined reflecting surface and collector lens and forms a continuous solid of revolution capable of being rotated at a high speed in air.

This embodiment, however, has a sector X of the film 34 which does not receive full pictures due to the reflecting surfaces 29 at this point being substantially in line with the incoming light beam, thus resulting in a break in the sequence of exposures.

Thus to overcome this disadvantage, two sets of rotating centre prisms are used in the embodiment shown in Figs. 3 to 6.

In this embodiment front and rear combined reflecting surfaces and collector lenses 35 and 36 respectively, each similar to that denoted by 28 in Figs. 1 and 2 are arranged on a common axis of rotation and with the reflecting surfaces thereof, 37 and 38 respectively, mutually in the same plane. Sectors or notches 36a and 36b are removed from the prism at opposite ends of the reflecting surface to provide recesses for prism holding means.

Twin rays of light from an object 39 pass through a large primary lens assembly 40. The two light beams emerging from the two apertures in a diaphragm 40a associated with the latter lens are then directed one on to one of the reflecting surfaces 37 of the front rotating prism 35, and one on to one of the reflecting surfaces 38 of the rear rotating prism 36. The latter light beam is directed from the lens 40 to the reflecting surface 38 by the prism and lens assembly 41 and prism and negative collector lens assembly 42. The former light beam is directed from the lens 40 to the reflecting surface 37 by a right-angle prism 43, lens assembly 44, right-angle prism 45 and combined prism and negative collector lens 46.

Each prism 35 and 36 again has associated therewith a peripheral series of fifty image projector lenses 47, 48 respectively.

The series of lenses 47, 48 are each of approximate semi-circular formation and are located in the plane swept through by the emergent light beam from the appropriate prism 35 or 36.

The series of lenses 47, 48 are disposed so as to produce a continuous series of equally spaced pictures for one revolution of the emergent light beams.

A strip of unexposed photographic film 49 is located around said lenses 47, 48 in an arcuate path in the planes defined by the emergent light beams therefrom. The strip of film 49 thus comprises a front part 49a of semi-circular formation for use in conjunction with the front prism 35, and a rear part 49b also of semi-circular formation, and for use in conjunction with the rear prism 36. The two parts are interconnected by an integral cross-over third part 49c.

Thus during a half revolution of the prisms 35, 36, the front and rear film parts comprising the major part of the film are scanned one after the other each for 180° thus providing a complete sequence of exposures, without any break, equivalent to 360°.

No exposure takes place on the film part 49c, because it is positioned completely between the emergent light beams from the lenses 47, 48.

In an actual construction of the camera, utilising the system shown in Figs. 3 to 6 the camera comprises a main casing 52 having mounted therein, the optical system shown in Figs. 3 to 6, similar parts being denoted by the same reference numerals.

An electric motor 53 drives the two prisms 35, 36, which are rigidly mounted into rotatable holders 35a, 35b, keyed to the motor shaft.

A drum 54 is mounted in said casing 52, said drum being provided with a series of apertures 55. During use of the camera, the film 49 is held tautly around said drum. Exposure of the film takes place through said apertures 55 by means of the light beams swept around said drum 54 by the prisms 35, 36. The apertures thus delineate the areas on the film for the separate exposures.

Figure 6:
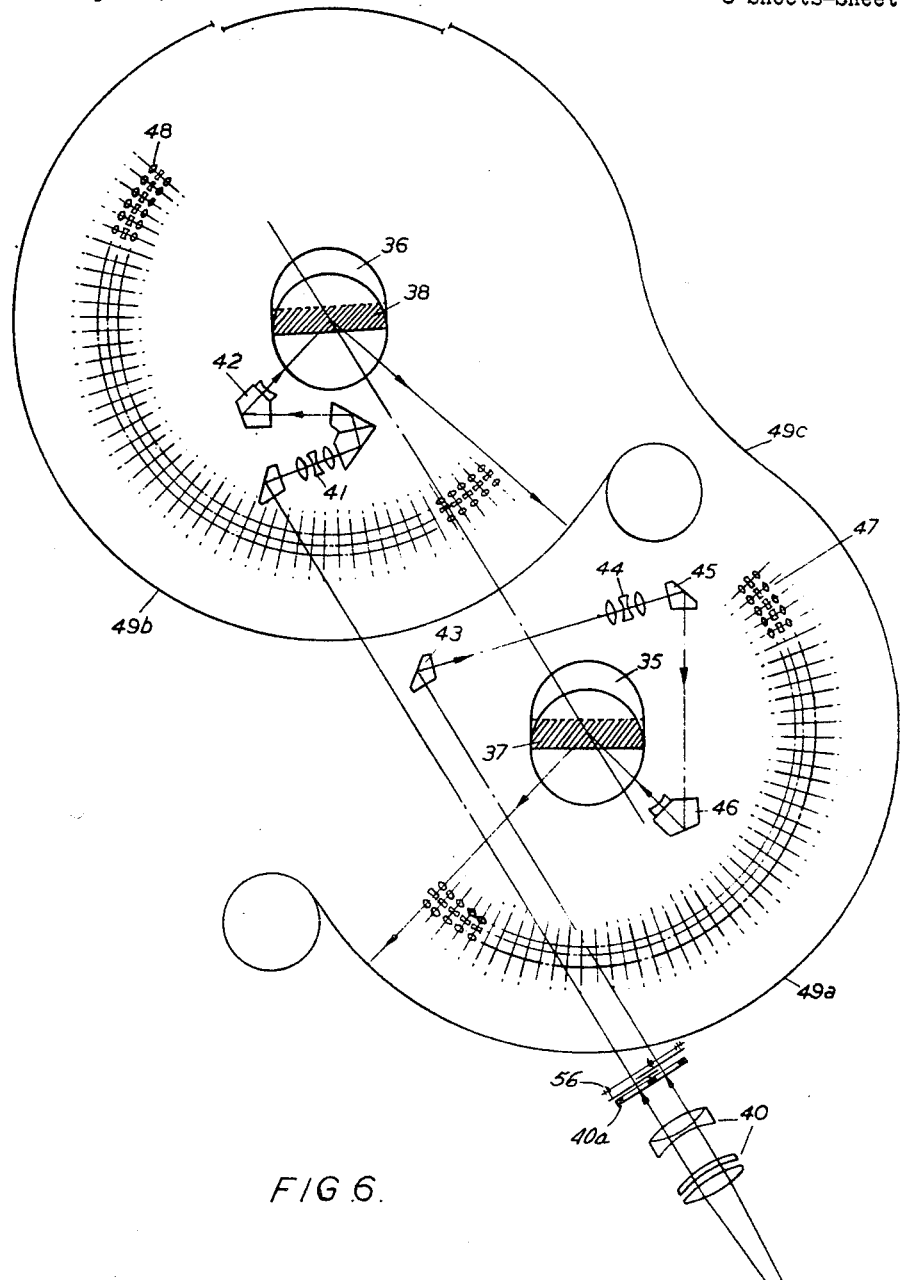
Fig. 6 is a diagrammatic perspective view of the optical system of apparatus according to one aspect of the invention.

Shutter mechanism 56, Figs. 6 and 12, driven in synchronism with the prisms 35, 36 is provided.

The series of lenses 47, 48 each contain fifty lenses corresponding to two series of fifty apertures 55 in the drum 54. The film part 49a is exposed during one quarter of a revolution of the prisms 35, 36, while the film part 49b is exposed during the next quarter revolution of the prisms. Thus if the shutter is giving an exposure time of two milliseconds during which the hundred pictures are formed on the film parts 49a, 49b, then the prisms 35, 36 are driven at 15,000 r.p.m. by the motor 53. In this case the camera will take 100 consecutive pictures of an occurrence taking place in two milliseconds, i.e. at a repetition rate of 50,000 pictures per second.

The camera is provided with an unexposed film cassette 57 and exposed film cassette 58 for the film 49.

The film parts 49a and 49b are conveyed during loading by means of conveyor ribbons or backing bands 59 and 60, respectively. The ribbon 59 is located between a receiving drum 61 and feed drum 62 interconnected by a flexible drive 62a. The ribbon 60 is similarly located between a receiving drum 63 and feed drum 64 interconnected by a flexible drive 64a, Fig. 8.

A series of steel ribbon and film-engaging antifriction guide elements or roller units 65 (hereinafter referred to simply as "compound roller units") project outwardly through further apertures 66 located in the drum 54, Fig. 12. These compound roller units are carried by cranks 67 pivoted to the drum 54 at their mid-points and interconnected by a linkage system 68 terminating in a manually-operable lever 69, Fig. 7, by means of which the compound roller units 65 may be moved within or without the periphery of the drum 54.

To prepare the camera for use, the film 49 is loaded in the following manner.

The lever 69 is moved to the "up" position, to effect movement of the compound roller units 65 to their limiting position outwith the periphery of the drum 54. Cover plates or doors 70 located on the upper surface of the camera casing 52 and cover plates 70a are then removed to allow access to the drum 54 in these regions.

Receiving drums 61 and 63 are then rotated in an anti-clockwise direction, when looking at Fig. 10, until their respective stops operate. The cassette 57 is loaded with the unexposed film 49 and is fitted into its housing 71. The film 49 is then passed through an aperture in this housing and is passed between double rollers 72 and attached to the inner surface of the conveyor ribbon 59 by means of a small clip (not shown).

The feed drum 62 is then rotated in an anti-clockwise direction until the stop operates, the steel ribbon 59 acting as a conveyor and drawing the film 49 around the outside of the rollers 65 to a fixed roller 73 adjacent the feed drum 62.

The film 49 is now disconnected from the clip on the ribbon 59 and is passed over roller 73 and a roller 74.

The film 49 is then passed by hand over cross-transfer rollers 75 to the rear of the camera where it is passed between double rollers 76, under a fixed roller 77 to a position adjacent the receiving drum 63.

The film 49 is then attached to the steel ribbon 60 by means of a clip (not shown). The feed drum 64 is then rotated in an anti-clockwise direction, whereby the film 49 is drawn around the rollers 65 to a position adjacent the feed drum 64.

The film 49 is then disconnected from the ribbon 60 and is passed under a fixed roller 78 and a sprocket wheel 79 to the exposed film cassette 58. The sprocket wheel 79 is coupled to an exposure indicator 80, Fig. 7.

The cover plates 70 and 70a are then replaced and screwed down.

The exposure indicator 80 is set to read zero. A film winding handwheel 81 coupled to the exposed film cassette 58 is then rotated until the indicator 80 registers unity.

Lever 69 is then set in the down position to withdraw the compound roller units 65 into the drum 54 and the unexposed film cassette 57 is locked by means of a clamping head 82.

Figure 9:
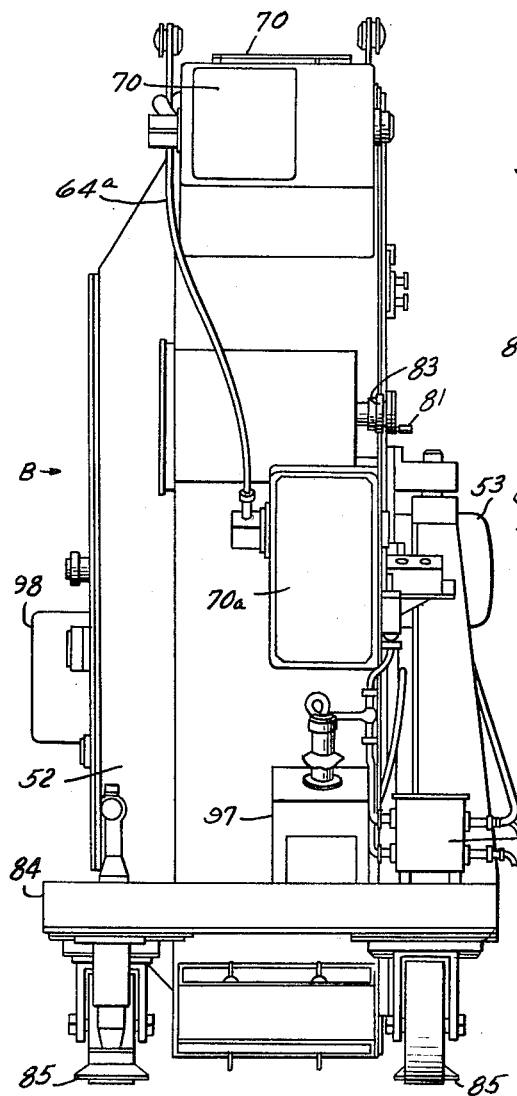
Figure 11:
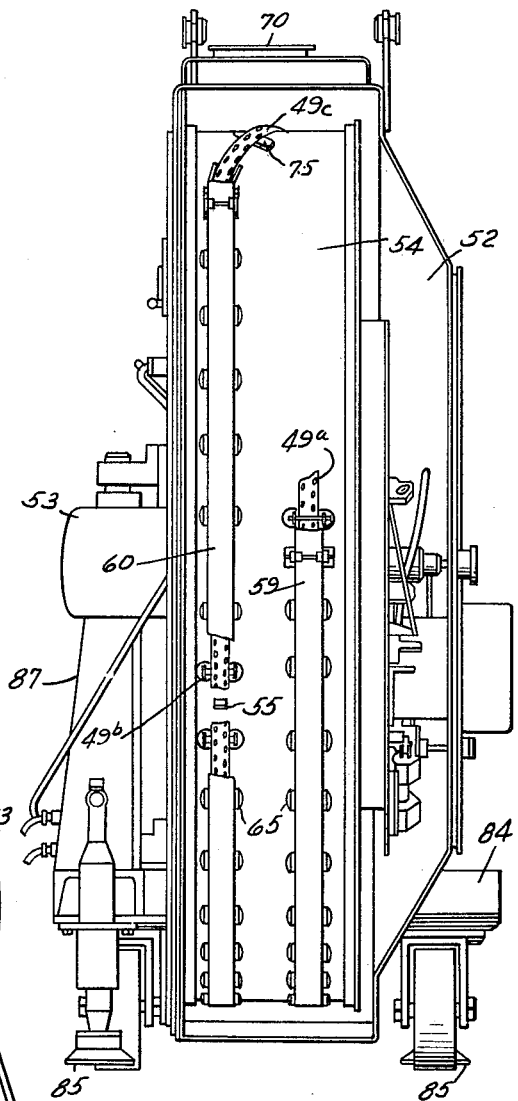

The film winding handwheel 81 is turned slightly to draw the film 49 tautly around the drum 54. The handwheel 81 is then locked by means of a clamping head 83, Fig. 9. The ribbons 59 and 60 are held tautly against the rollers 65 at all times by means of spring connections in the receiving drums 61 and 63. The camera is then ready for the first exposure.

To change the film after an exposure, the clamping heads 82 and 83 are released, lever 69 is set in the "up" position and the film winding handwheel 81 is rotated until the next exposure is registered by the indicator 80. The procedure described in the two preceding paragraphs is then carried out again. The lens 40, or the assembly 50 and 51 are detachable from the camera in their holders. Lenses for various object distances are supplied and each lens is mounted in an interchangeable holder.

The camera main casing 52 is mounted upon a four wheeled bogie 84, but the latter may be lifted and supported by a three-point support 85 by means of adjustable screw jacks 86.

Figure 7:
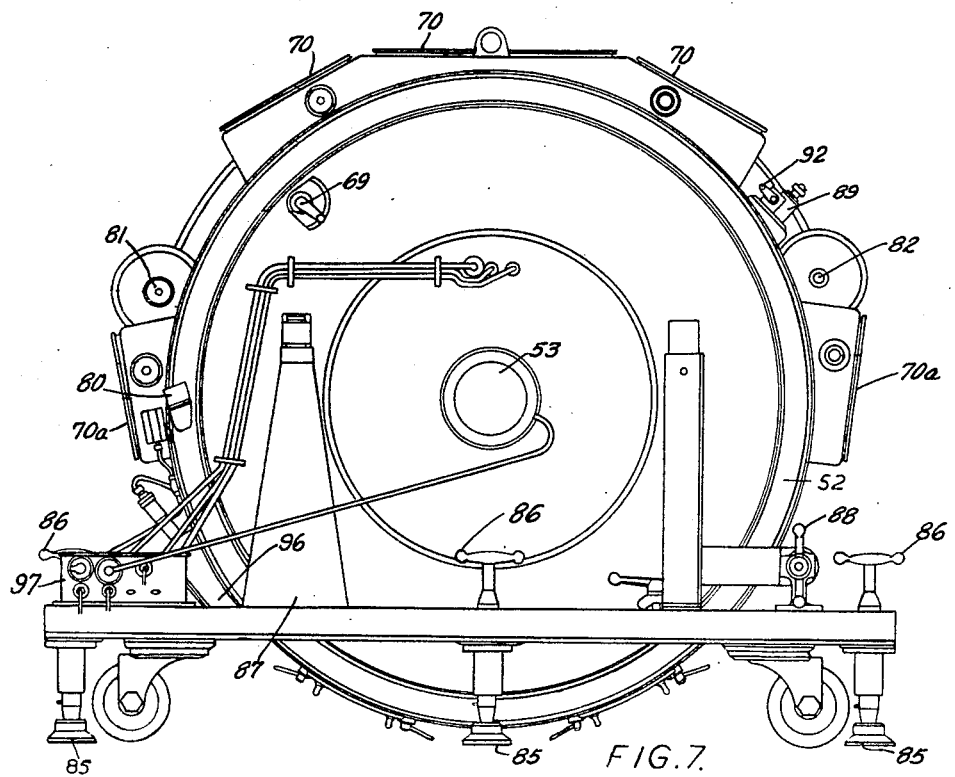
Figs. 7, 8 and 9 are respectively rear, front and side elevations of the apparatus shown in Fig. 6.

The camera casing 52 is pivotally supported upon the bogie 84 by means of a bracket 87, Fig. 7, and it may be swung about the bracket 87 by means of a handwheel 88.

A focussing telescope 89 is provided on the casing 52. Light from lens 40 is directed to the telescope 89 through a lens system 90 by means of a prism (not shown) which is mounted on a plate 91 and may be swung into the parallel rays between the primary lens of the camera and the intermediate prisms by means of a lever 92 and Bowden cable 93. A focussing head 94 is provided for focussing the camera.

Thus, to set up the camera for photographing an event, the camera is adjusted for height by means of the screw jacks 86, lined up for azimuth by means of the handwheel 88 and set for focus relative to a graticule defining the area to be photographed and fitted in the focussing telescope 89.

Figure 8:
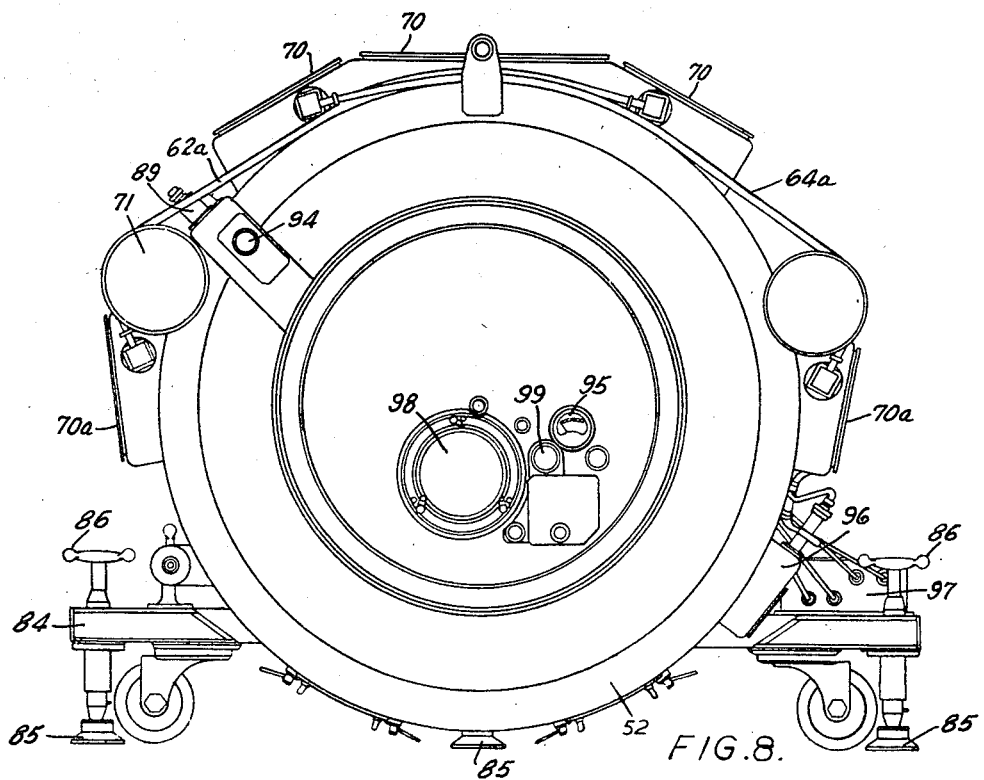

In Fig. 8, the numeral 95 indicates a micro-ammeter on which a signal from a photo-electric cell, not shown, is produced, when the shutter mechanism is in a position corresponding to the start of an exposure, and numerals 96, 97, 98 and 99 respectively indicate a housing for a projection unit, a junction box, a cover plate for the primary lens assembly 40 and a cover plate for the photo-electric cell.

What we claim is:

1. Photographic apparatus for providing a series of exposures over a very short time interval of very fast occurrences, comprising means for supporting a length of photographic film in an arcuate path; a rotary reflecting prism having a flat internal reflecting surface adapted for reflection on both sides thereof, and outer prismatic components on opposite sides of said reflecting surface, the outer surfaces of said components being shaped as part of a sphere, said reflecting surface containing the centre of curvature of such sphere, whereby light reflected from the centre of said reflecting surface may enter and leave the prism through and normal to said outer surfaces, means adapted to rotate said prism at high speed about the centre of curvature of the sphere, so that it reflects an image-carrying light beam from the object along a narrow field towards said arcuate path in order to scan same; means for focussing an image of the object on said reflecting surface and on said arcuate path respectively; aperture means for delineating the impact of the light beam on said path at intervals in order to provide separate exposures; and shutter means for limiting the access of rays from the object to the arcuate path to a period of time of a predetermined value in order to prevent double exposure.

2. Photographic apparatus as claimed in claim 1, in which said film supporting means comprises a drum having a peripheral series of apertures to allow passage of the light beam to the film and provide separate exposures thereon.

3. In combination two prisms each comprising a flat internal reflecting surface adapted for reflection on both sides thereof, and outer prismatic components on opposite sides of said reflecting surface, the outer surfaces of said components being shaped as part of a sphere, said reflecting surface containing the centre of curvature of such sphere, whereby light reflected from the centre of said reflecting surface may enter and leave each prism through and normal to said outer surface, means rotating said prisms in synchronism about a common axis passing through the centre of curvature of the two spheres; two arcuate film supports one opposed to each prism, each film support having centre of curvature coincident with the axis of rotation of the opposed prism; means leading a light beam from the object on to the reflecting surface of each prism to present an image of the object on the axis of rotation of each prism, each prism and its co-operating film support thus forming an exposure unit operative for film exposure when the prism reflects light on to the film on the co-operating support, the respective exposure units being disposed relative to the light beams incident thereon so that the exposure operation of one follows that of the other without interruption, whereby the two lengths of the film on the two film supports are scanned in succession without any break in the continuity of exposure.

4. Photographic apparatus in combination with two reflecting prisms adapted for high speed rotation, each prism comprising a thin reflecting coating which reflects light on both sides thereof and which contains the axis of rotation of the prism; solid prismatic material on both sides of said coating, the outer surface of said prismatic material forming part of a sphere whose centre is on said axis, the outer shape of the prism forming a circular solid of revolution about said axis, a holder for each prism adapted to rotate each prism in synchronism about said axis, two arcuate film supports one opposed to each prism, each film support having centre of curvature coincident with the axis of rotation of the opposed prism; means leading a light beam from the object on to the reflecting surface of each prism to present an image of the object on the axis of rotation of each prism, each prism and its co-operating film support thus forming an exposure unit operative for film exposure when the prism reflects light on to the film on the co-operating support, the respective exposure units being disposed relative to the light beams incident thereon so that the exposure operation of one follows that of the other without interruption, whereby the two lengths of the film on the two film supports are scanned in succession without any break in the continuity of exposure.

5. The invention claimed in claim 4, in which the lengths of film on the two supports are each scanned through 180°.

6. The invention claimed in claim 5, in which the prisms are spaced apart along a common axis of rotation, the two lengths of film being parts of a continuous piece of film.

7. Photographic apparatus for providing a series of exposures over a very short time interval of very fast occurrences comprising support means for supporting a length of photographic film in an arcuate path, rotary light-reflecting means at the centre of curvature of said path, drive means for said reflecting means adapted to rotate same at high speed so that it reflects an image-carrying light beam from an object along a narrow field towards said path in order to scan same, lens means for focussing an image of the object on said reflecting means and on said path respectively, and aperture means for delineating the impact of the light beam on said path at intervals in order to provide separate exposures; said reflecting means comprising a reflecting prism having a flat internal reflecting surface adapted for reflection on both sides thereof and outer prismatic components on opposite sides of said reflecting surface, the outer surfaces of said components being shaped as part of a sphere, and said reflecting surface containing the centre of curvature of such sphere, whereby said prism acts as a combined reflecting surface and collector lens, and forms a continuous solid of revolution capable of being rotated at high speeds in air, and light reflected from the centre of said reflecting surface may enter and leave the prism through and normal to said outer surface.

References Cited in the file of this patent

UNITED STATES PATENTS

| Number | Name | Date |
| --- | --- | --- |
| 1,539,579 | Kucharski | May 26, 1925 |
| 1,826,090 | Phelps | Oct. 6, 1931 |
| 1,883,019 | Shore | Oct. 18, 1932 |
| 2,199,843 | Schmidt | May 7, 1940 |
| 2,374,027 | McMaster et al. | Apr. 17, 1945 |
| 2,400,887 | Miller | May 28, 1946 |
| 2,494,082 | Baird | Jan. 10, 1950 |
| 2,668,473 | Brixner | Feb. 9, 1954 |